United States Patent
Aono et al.

(10) Patent No.: US 12,487,383 B2
(45) Date of Patent: Dec. 2, 2025

(54) CONCAVE DIFFRACTION GRATING AND OPTICAL DEVICE

(71) Applicant: Hitachi High-Tech Corporation, Tokyo (JP)

(72) Inventors: Takanori Aono, Tokyo (JP); Yoshisada Ebata, Tokyo (JP); Kenta Yaegashi, Tokyo (JP); Shigeru Matsui, Tokyo (JP); Isao Uchida, Tokyo (JP); Jiro Yamamoto, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 569 days.

(21) Appl. No.: 17/798,228

(22) PCT Filed: Jan. 14, 2021

(86) PCT No.: PCT/JP2021/001001
§ 371 (c)(1),
(2) Date: Aug. 8, 2022

(87) PCT Pub. No.: WO2021/166502
PCT Pub. Date: Aug. 26, 2021

(65) Prior Publication Data
US 2023/0079523 A1    Mar. 16, 2023

(30) Foreign Application Priority Data
Feb. 20, 2020   (JP) .................. 2020-027121

(51) Int. Cl.
*G02B 5/18*    (2006.01)
*B32B 37/12*   (2006.01)
*G02B 27/01*   (2006.01)

(52) U.S. Cl.
CPC ......... *G02B 5/1852* (2013.01); *G02B 5/1861* (2013.01)

(58) Field of Classification Search
CPC ............................ G02B 5/1852; G02B 5/1861
(Continued)

(56) References Cited

U.S. PATENT DOCUMENTS

2013/0335816 A1    12/2013   Kierey et al.
2015/0192713 A1     7/2015   Aono et al.
(Continued)

FOREIGN PATENT DOCUMENTS

DE   43 40 103 A1   5/1995
JP   8-211214 A     8/1996
(Continued)

OTHER PUBLICATIONS

Carl Zeiss Laser Optics GmbH (JP 2014514737), Jun. 19, 2014, Method of manufacturing a reflective optical component for an EUV projection exposure apparatus and components of this type English Translation of foreign reference first sumbitted by applicant in the IDS filed on Aug. 8, 2022.*
(Continued)

*Primary Examiner* — Bumsuk Won
*Assistant Examiner* — Grant A Gagnon
(74) *Attorney, Agent, or Firm* — Crowell & Moring LLP

(57) ABSTRACT

The present invention provides a concave diffraction grating and an optical device using the concave diffraction grating, the concave diffraction grating being capable of preventing deformation of a reflection film due to the influence of temperature, and preventing deterioration in optical characteristic due to temperature. This concave diffraction grating is provided with: a reflection film (22) having a plurality of grating grooves (21); a holding film (25) comprising metal and having one surface on which the reflection film (22) is provided; a concave substrate (24) having a concave surface (24a); and an affixing layer (23) provided between the concave surface (24a) and the other surface of the holding
(Continued)

film (25), and affixing the holding film (25) and the reflection film (22) to the concave substrate (24).

8 Claims, 5 Drawing Sheets

(58) Field of Classification Search
USPC ............................................. 359/566
See application file for complete search history.

(56) References Cited

U.S. PATENT DOCUMENTS

| | | |
|---|---|---|
| 2016/0259098 A1 | 9/2016 | Sasai |
| 2018/0031840 A1 | 2/2018 | Hofmann et al. |

FOREIGN PATENT DOCUMENTS

| | | |
|---|---|---|
| JP | 2004-361635 A | 12/2004 |
| JP | 2006-58682 A | 3/2006 |
| JP | 2009-92687 A | 4/2009 |
| JP | 2012-252307 A | 12/2012 |
| JP | 2014-13366 A | 1/2014 |
| JP | 2014-514737 A | 6/2014 |
| JP | 2017-211670 A | 11/2017 |
| JP | 2018-506743 A | 3/2018 |
| WO | WO 2012/067239 A1 | 5/2012 |
| WO | WO 2016/059928 A1 | 4/2016 |
| WO | WO 2017/187998 A1 | 11/2017 |

OTHER PUBLICATIONS

International Search Report (PCT/ISA/210) issued in PCT Application No. PCT/JP2021/001001 dated Feb. 22, 2021 with English translation (10 pages).

Japanese-language Written Opinion (PCT/ISA/237) issued in PCT Application No. PCT/JP2021/001001 dated Feb. 22, 2021 (five (5) pages).

International Preliminary Report on Patentability (PCT/IPEA/409) issued in PCT Application No. PCT/JP2021/001001 dated Jan. 13, 2022 (four (4) pages).

\* cited by examiner

CONCAVE DIFFRACTION GRATING AND OPTICAL DEVICE

TECHNICAL FIELD

The present invention relates to a concave diffraction grating and an optical device including the concave diffraction grating.

BACKGROUND ART

The concave diffraction grating is an optical element used in an optical device such as a spectrophotometer and has a function of dispersing and condensing light for each wavelength. In the optical device including the concave diffraction grating, the number of components of the device can be reduced, and the configuration of the device can be simplified.

In a conventional diffraction grating, a reflection film on which a grating groove is formed is affixed to a substrate. Examples of a conventional diffraction grating are described in PTLs 1 to 3.

PTL 1 describes that a grating surface of a diffraction grating is formed by forming a reflection film (aluminum film) in a mold (master diffraction grating) in which grating grooves are formed, affixing the reflection film to a glass substrate with a resin adhesive, peeling the glass substrate from the mold, and inversely bonding the reflection film to the substrate.

PTL 2 describes that a diffraction grating is manufactured by forming sawtooth-shaped grating grooves on a flat plate-shaped substrate such as quartz or glass by holographic exposure and ion beam etching, and coating the surface of the grating grooves with a metal film such as aluminum or gold.

PTL 3 describes that a load is applied to a planar diffraction grating placed on a curved surface affixing substrate to form a mold of a curved surface diffraction grating. A concave diffraction grating is produced by transferring the shape of the mold of the curved diffraction grating to a reflection film (metal or resin) and disposing a curable resin and an affixing substrate on the reflection film.

CITATION LIST

Patent Literature

PTL 1: JP 2009-92687 A
PTL 2: JP 2017-211670 A
PTL 3: WO 2016/059928 A

SUMMARY OF INVENTION

Technical Problem

The diffraction gratings described in PTLs 1 and 3 are produced by transferring the shape of a diffraction grating mold to a reflection film (forming a reflection film in the diffraction grating mold), and the reflection film is affixed to a substrate with a resin. In these diffraction gratings, since the reflection film is disposed on a resin, there is a problem that when the resin expands and contracts due to an influence of temperature, humidity, or the like, the reflection film deforms to affect optical characteristics of the diffraction grating.

In the diffraction grating described in PTL 2, since the surface of the grating grooves formed on a substrate such as quartz or glass is coated with a metal film (reflection film), the reflection film is hardly affected by temperature, humidity, and the like. However, since the reflection film is formed by coating the surface of the grating grooves, there is a problem that the top of each grating groove (the top of the protrusion constituting the grating groove) of the reflection film is rounded, and the optical characteristics of the diffraction grating may deteriorate.

An object of the present invention is to provide a concave diffraction grating that can prevent deformation of a reflection film due to an influence of temperature and can prevent deterioration of optical characteristics due to temperature, and an optical device including the concave diffraction grating.

Solution to Problem

A concave diffraction grating according to the present invention includes a reflection film including a plurality of grating grooves, a holding film formed of metal and having one surface provided with the reflection film, a concave substrate including a concave surface, and an affixing layer that is provided between the concave surface and the other surface of the holding film and affixes the holding film and the reflection film to the concave substrate.

Advantageous Effects of Invention

The present invention can provide a concave diffraction grating that can prevent deformation of a reflection film due to an influence of temperature and can prevent deterioration of optical characteristics due to temperature, and an optical device including the concave diffraction grating.

DESCRIPTION OF EMBODIMENTS

The concave diffraction grating according to the present invention includes a holding film between a reflection film including grating grooves and a concave substrate, and includes an affixing layer that affixes the holding film and the reflection film to the concave substrate. The concave diffraction grating according to the present invention can prevent deformation of the grating grooves with the holding film, and can prevent deterioration of optical characteristics even when the affixing layer deforms due to the influence of temperature or humidity or the temperature of the reflection film rises due to light irradiation. The holding film inhibits deformation of the reflection film and prevents deterioration of optical characteristics due to an influence of the temperature of the concave diffraction grating. When the concave diffraction grating according to the present invention includes the concave substrate, the affixing layer, and the holding film each formed of a material having high thermal conductivity, heat is easily released from the concave diffraction grating, and therefore, the concave diffraction grating can inhibit a temperature rise due to heat and can have a stable spectral performance even when it is irradiated with light having high energy. The concave diffraction grating according to the present invention has a small variation in the shape of grating grooves of the reflection film and is excellent in optical characteristics.

Hereinafter, a concave diffraction grating and an optical device according to an embodiment of the present invention will be described with reference to the drawings.

First Embodiment

Figure 1:
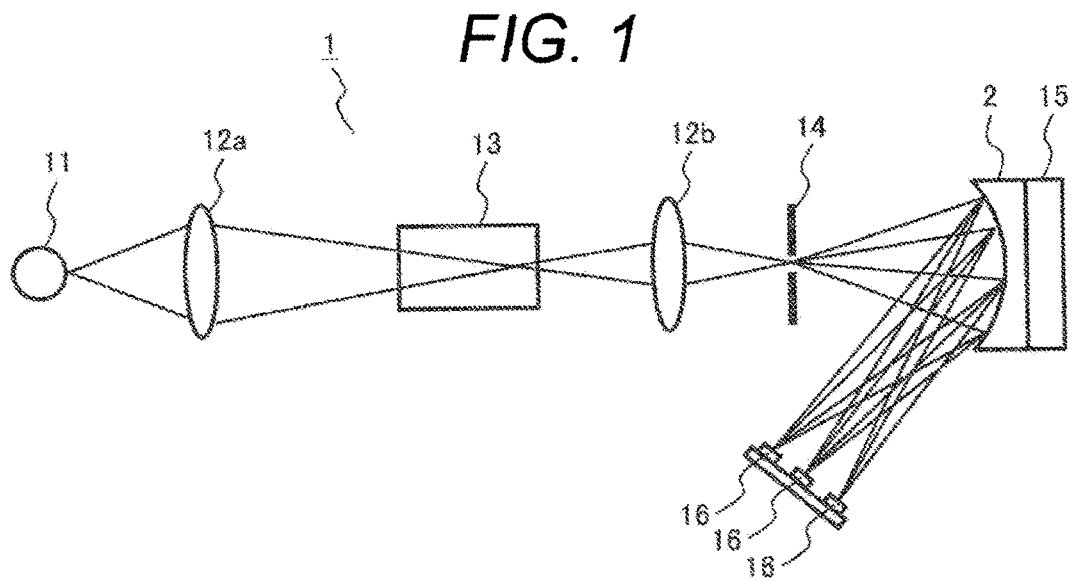
FIG. 1 is a diagram illustrating an optical device according to a first embodiment of the present invention.

FIG. 1 is a diagram illustrating an optical device according to a first embodiment of the present invention. The optical device 1 is used for concentration measurement and substance identification of a sample (for example, a chemical substance or a biological substance) by utilizing a fact that light having a wavelength specific to chemical bonding of a substance contained in the sample is selectively absorbed when the sample is irradiated with light.

The optical device 1 includes a white light source 11, condenser lenses 12a, 12b, a sample chamber 13, a slit 14, a concave diffraction grating 2, and a plurality of detectors 16. The optical device 1 preferably includes a cooling device 15.

The white light source 11 emits light to irradiate the sample.

The condenser lens 12a condenses the light emitted from the white light source 11 and irradiates the sample in the sample chamber 13 with the light.

The sample chamber 13 stores the sample to be measured.

The condenser lens 12b condenses the light transmitted through the sample on the slit 14.

The slit 14 allows the light condensed by the condenser lens 12b to pass therethrough and irradiates the concave diffraction grating 2 with the light.

The concave diffraction grating 2 disperses the light passing through the slit 14 for each wavelength to form spectra.

The plurality of detectors 16 are provided according to the wavelengths to be detected and are disposed linearly. The plurality of detectors 16 detect the formed spectra and measure the intensity of light for each wavelength.

The cooling device 15 can be configured using, for example, a radiator or a Peltier element, and cools the concave diffraction grating 2. When the concave diffraction grating 2 is irradiated with light having high energy, the temperature of the concave diffraction grating 2 rises, and the reflection film may deform to deteriorate optical characteristics (spectral performance). It is preferable to install the cooling device 15 in such a manner as to be in contact with the concave diffraction grating 2 to prevent a decrease in optical characteristics due to a temperature rise. The concave diffraction grating 2 is cooled by the cooling device 15, and a temperature rise is inhibited. Alternatively, the housing constituting the optical device 1 may be regarded as the cooling device 15, and the concave diffraction grating 2 may be placed in contact with the housing.

Figure 2:
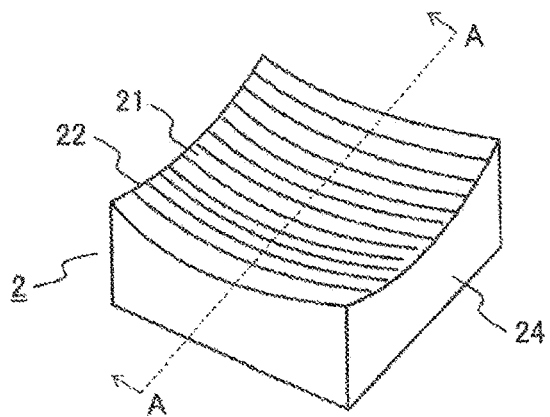
FIG. 2 is a perspective view illustrating a concave diffraction grating according to the first embodiment of the present invention.
Figure 3:
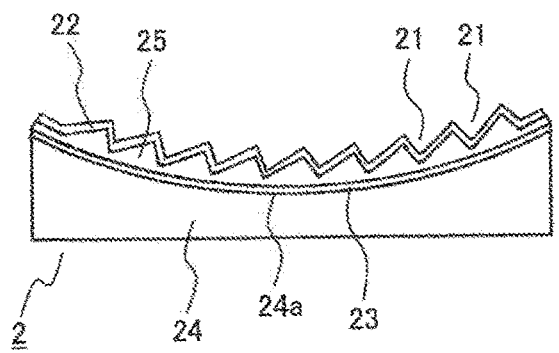
FIG. 3 is a sectional view of the concave diffraction grating taken along the line A-A in FIG. 2.

The concave diffraction grating 2 according to the first embodiment of the present invention will be described with reference to FIGS. 2 and 3. FIG. 2 is a perspective view illustrating the concave diffraction grating 2 according to the present embodiment. FIG. 3 is a sectional view of the concave diffraction grating 2 taken along the line A-A in FIG. 2.

The concave diffraction grating 2 according to the present embodiment includes a concave substrate 24, an affixing layer 23, a holding film 25, and a reflection film 22. The affixing layer 23, the holding film 25, and the reflection film 22 have a concave shape that is concave toward the concave substrate 24.

The concave substrate 24 may be formed of metal such as copper or aluminum, silicon, or glass. On the concave substrate 24, the affixing layer 23, the holding film 25, and the reflection film 22 are provided in this order. The concave substrate 24 includes a concave surface 24a, and the affixing layer 23 is provided on the concave surface 24a. The concave surface 24a has any curvature.

The affixing layer 23 is formed of resin or metal, is provided between the concave substrate 24 and the holding film 25 and serves as an adhesive material for affixing the holding film 25 and the reflection film 22 to the concave substrate 24. The affixing layer 23 may be formed of, for example, thermosetting resin such as epoxy, or metal for adhesion such as solder, tin, or indium. The affixing layer 23 may be formed of thermosetting resin containing metal particles (for example, particles of copper or aluminum). The metal particles increase the thermal conductivity of the affixing layer 23.

The holding film 25 is formed of metal and is a member for maintaining the shape of the reflection film 22. The holding film 25 is affixed to the concave substrate 24 by the affixing layer 23. The reflection film 22 is provided on one surface of the holding film 25. The affixing layer 23 is provided on the other surface (that is, the surface facing the concave substrate 24) of the holding film 25. The holding film 25 is preferably formed of metal having high thermal conductivity such as copper or nickel.

The reflection film 22 includes a plurality of grating grooves 21 and reflects light with the grating grooves 21. The reflection film 22 may be formed of a material having high reflectance such as aluminum or gold. The reflection film 22 formed of a material having high thermal conductivity such as aluminum or gold can effectively release heat and prevent deformation due to a temperature rise.

The grating grooves 21 may have any shape, and examples of the shape include a sawtooth shape, a corrugated shape (for example, a sinusoidal waveform shape), and a rectangular shape (for example, a pulse waveform shape). The grating grooves 21 having a sawtooth shape have an advantage that they are easily produced in the method for manufacturing the concave diffraction grating 2 according to the present embodiment described later.

The holding film 25 is a member for preventing deformation of the grating grooves 21 of the reflection film 22 due to temperature or humidity and maintaining the shape of the reflection film 22. The other surface (that is, the surface affixed to the concave substrate 24) of the holding film 25 is a flat concave surface. As illustrated in FIG. 3, it is preferable that the holding film 25 be also present between the grating grooves 21 of the reflection film 22. When the holding film 25 is also present between the grating grooves 21, one surface (that is, the surface on which the reflection film 22 is provided) of the holding film 25 has the same shape (for example, a sawtooth shape, a corrugated shape, or a rectangular shape) as the grating grooves 21.

The reflection film 22 deforms when heat is accumulated by light and the temperature rises. It is necessary to release heat from reflection film 22 to prevent deformation of reflection film 22 due to a temperature rise. It is therefore preferable that the concave substrate 24, the affixing layer 23, and the holding film 25 be formed of a material having high thermal conductivity in the concave diffraction grating 2 according to the present embodiment.

Here, a configuration of a conventional concave diffraction grating will be described.

Figure 4:
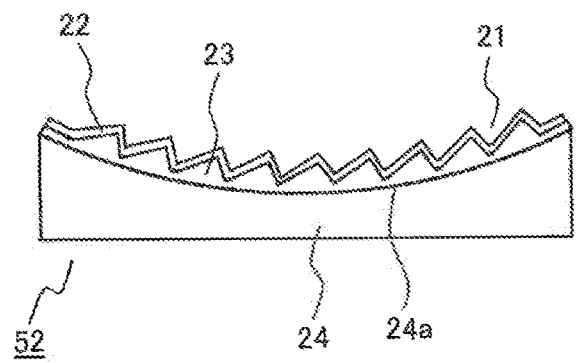
FIG. 4 is a sectional view of a conventional concave diffraction grating.

FIG. 4 is a sectional view of a conventional concave diffraction grating 52. FIG. 4 corresponds to FIG. 3. In the conventional concave diffraction grating 52, the affixing layer 23 and the reflection film 22 are provided on the concave substrate 24 having the concave surface 24a. The affixing layer 23 is a member that is formed of resin and affixes the reflection film 22 to the concave substrate 24. The reflection film 22 includes a plurality of grating grooves 21.

The affixing layer 23 is also present between the grating grooves 21 of the reflection film 22. Consequently, when the affixing layer 23 deforms due to the influence of temperature or humidity, the reflection film 22 deforms, the grating grooves 21 lose their shape, and the optical characteristics of the concave diffraction grating 52 may deteriorate.

In the concave diffraction grating 2 (FIGS. 2 and 3) according to the present embodiment having the above-described configuration, the holding film 25 inhibits deformation of the reflection film 22, and it is possible to prevent deterioration of optical characteristics of the concave diffraction grating 2 even when the affixing layer 23 deforms (for example, expands and contracts) due to the influence of temperature or humidity.

In addition, when the affixing layer 23 and the concave substrate 24 are formed of a material having high thermal conductivity, it is possible to effectively inhibit the temperature from rising due to accumulation of heat in the concave diffraction grating 2.

The holding film 25 preferably has a linear expansion coefficient with which the shape of the holding film 25 changes in the same manner as the reflection film 22 due to a temperature change. That is, the linear expansion coefficient of the holding film 25 is preferably a value substantially equal to or close to the linear expansion coefficient of the reflection film 22. The holding film 25 and the reflection film 22 having substantially the same linear expansion coefficient value deform together when they deform due to a temperature rise, and therefore, the grating grooves 21 of the reflection film 22 stretch but can maintain its shape.

In the conventional concave diffraction grating 52 (FIG. 4), the linear expansion coefficient of the affixing layer 23 is larger than the linear expansion coefficient of the reflection film 22. Consequently, in the conventional concave diffraction grating 52, when the affixing layer 23 deforms due to a temperature rise, the grating grooves 21 of the reflection film 22 deform and lose their shape.

Note that, as described with reference to FIGS. 5C and 5D and FIGS. 6C and 6D, a seed film 26 is provided between the reflection film 22 and the holding film 25. The seed film 26 is not illustrated in FIG. 3. The seed film 26 will be described later.

Next, an example of a method for manufacturing the concave diffraction grating 2 according to the present embodiment will be described.

FIGS. 5A to 5H are diagrams illustrating first to eighth steps of the method for manufacturing the concave diffraction grating 2 according to the present embodiment. A part of a planar substrate 30 and a planar diffraction grating 20 is illustrated in FIGS. 5A to 5D.

Figure 5A:
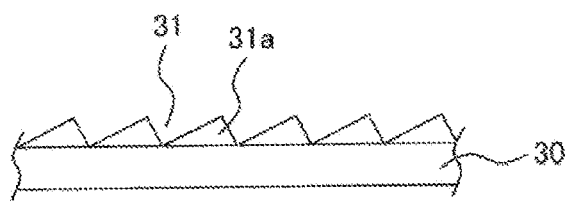
FIG. 5A is a diagram illustrating a first step of a method for manufacturing the concave diffraction grating according to the first embodiment of the present invention.

First, as illustrated in FIG. 5A, grating grooves 31 are formed on the planar substrate 30. The planar substrate 30 may be formed of metal such as copper or aluminum, silicon, or glass. The grating grooves 31 may be formed on the planar substrate 30 by providing protrusions 31a on a surface of the planar substrate 30 by, for example, photolithography, etching, or the like used in a manufacturing process of a semiconductor element. the protrusions 31a may have any shape similarly to the grating grooves 21 of the concave diffraction grating 2, and examples of the shape include a sawtooth shape, a wave shape, and a rectangular shape.

Figure 5B:
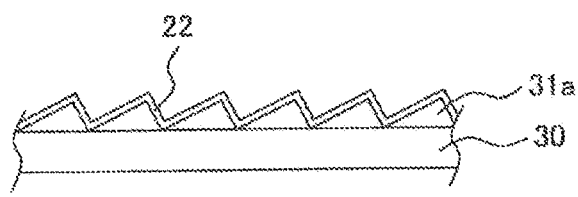
FIG. 5B is a diagram illustrating a second step of the method for manufacturing the concave diffraction grating according to the first embodiment of the present invention.

Next, as illustrated in FIG. 5B, the reflection film 22 is formed on the grating grooves 31 (protrusions 31a) by vapor deposition or sputtering. The reflection film 22 is formed to have unevenness along the protrusions 31a.

Figure 5C:
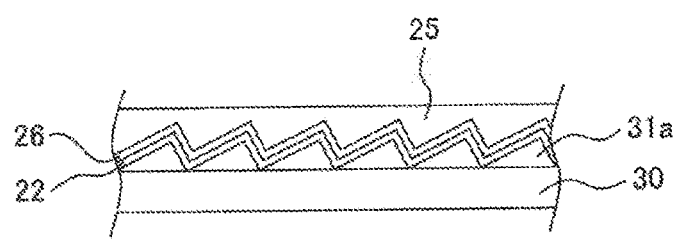
FIG. 5C is a diagram illustrating a third step of the method for manufacturing the concave diffraction grating according to the first embodiment of the present invention.

Next, as illustrated in FIG. 5C, the seed film 26 is formed on the reflection film 22 by vapor deposition or sputtering, and the holding film 25 is formed on the seed film 26 by plating.

The seed film 26 is used to allow a current to easily flow and grow the holding film 25 when the holding film 25 is formed by plating and is particularly effective when the reflection film 22 is formed of aluminum. The seed film 26 prevents diffusion (for example, diffusion of aluminum constituting the reflection film 22 into the holding film 25) between the reflection film 22 and the holding film 25. The seed film 26 may be formed of a plurality of kinds of metal films. For example, the seed film 26 may be formed by forming a film of a metal (for example, titanium) having a large adhesion force with the reflection film 22, a film of a metal (for example, platinum) that prevents diffusion due to a temperature rise of the reflection film 22, and a film of a metal (for example, gold or platinum) that is hardly oxidized in this order on the reflection film 22.

Figure 5D:
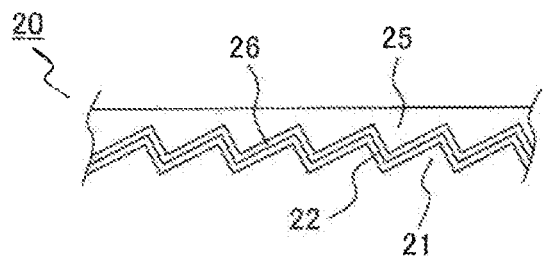
FIG. 5D is a diagram illustrating a fourth step of the method for manufacturing the concave diffraction grating according to the first embodiment of the present invention.

Next, as illustrated in FIG. 5D, the planar substrate 30 on which the grating grooves 31 (protrusions 31a) are formed is peeled off from a stacked body of the reflection film 22, the seed film 26, and the holding film 25, whereby the planar diffraction grating 20 is produced. The planar diffraction grating 20 is a planar stacked body in which the reflection film 22, the seed film 26, and the holding film 25 are disposed in this order. In the reflection film 22, the grating grooves 21 are formed by the protrusions 31a. The planar diffraction grating 20 is produced by, for example, dissolving and removing the protrusions 31a to peel off the planar substrate 30.

Figure 5E:
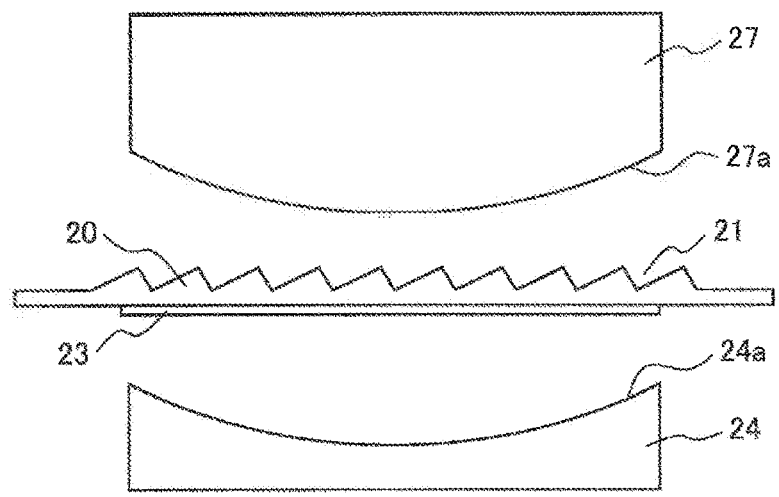
FIG. 5E is a diagram illustrating a fifth step of the method for manufacturing the concave diffraction grating according to the first embodiment of the present invention.

Next, as illustrated in FIG. 5E, the affixing layer 23 is disposed on the opposite surface of the planar diffraction grating 20 from the surface provided with the grating grooves 21. Then, a convex substrate 27 is disposed to face the surface of the planar diffraction grating 20 on which the grating grooves 21 are provided, and the concave substrate 24 is disposed to face the surface of the planar diffraction grating 20 on which the affixing layer 23 is disposed. The convex substrate 27 is a substrate having a convex surface 27a and is disposed such that the convex surface 27a faces the planar diffraction grating 20. The concave substrate 24 is a substrate having the concave surface 24a and is disposed such that the concave surface 24a faces the planar diffraction grating 20.

Figure 5F:
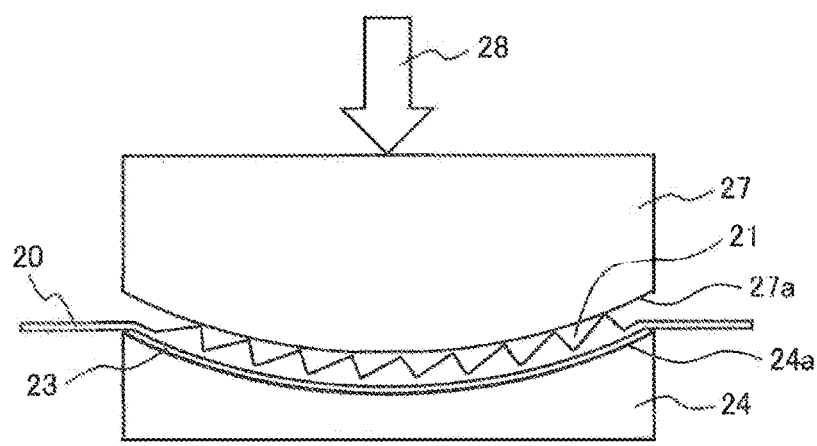
FIG. 5F is a diagram illustrating a sixth step of the method for manufacturing the concave diffraction grating according to the first embodiment of the present invention.

Next, as illustrated in FIG. 5F, under a vacuum atmosphere, a load 28 is applied to the convex substrate 27 at a temperature equal to or higher than the adhesion temperature or eutectic point of the affixing layer 23, and the planar diffraction grating 20 is sandwiched between the convex substrate 27 and the concave substrate 24. By this heating and pressurization, the shape of the planar diffraction grating 20 is deformed to follow the shapes of the convex surface 27a of the convex substrate 27 and the concave surface 24a of the concave substrate 24, and the planar diffraction grating 20 is adhered to the concave substrate 24. The affixing layer 23 is cooled and cured in a state where the load 28 is applied to the convex substrate 27 to deform the planar diffraction grating 20. When the affixing layer 23 is cured, the planar diffraction grating 20 is affixed to the concave substrate 24.

Note that the grating grooves 21 do not deform even when the load 28 is applied to the convex substrate 27 and the planar diffraction grating 20 is sandwiched between the convex substrate 27 and the concave substrate 24. It has been verified by experiments that, even when a force is applied to the top of each grating groove 21 (top of the protrusion constituting the grating groove 21), the grating grooves 21 do not deform because the force disperses to the sides sandwiching the top of the grating groove 21.

Figure 5G:
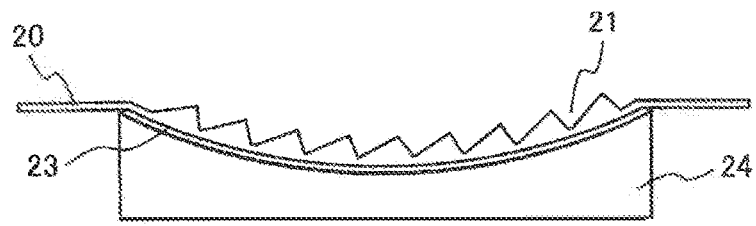
FIG. 5G is a diagram illustrating a seventh step of the method for manufacturing the concave diffraction grating according to the first embodiment of the present invention.

Next, as illustrated in FIG. 5G, after the affixing layer 23 is cured and the planar diffraction grating 20 is affixed to the concave substrate 24, the convex substrate 27 is removed.

Figure 5H:
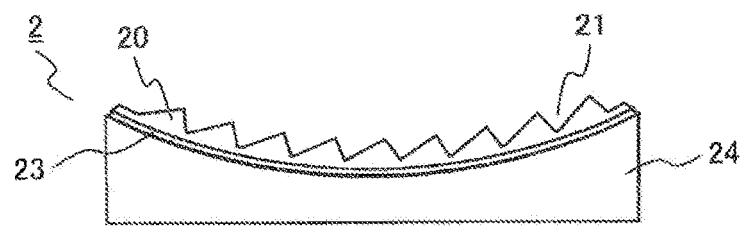
FIG. 5H is a diagram illustrating an eighth step of the method for manufacturing the concave diffraction grating according to the first embodiment of the present invention.

Next, as illustrated in FIG. 5H, a portion of the planar diffraction grating 20 overflowing from the concave substrate 24 is removed, whereby the concave diffraction grating 2 can be manufactured.

The concave diffraction grating 2 according to the present embodiment can also be manufactured by a method described below.

FIGS. 6A to 6D are diagrams corresponding to FIGS. 5A to 5D, illustrating first to fourth steps of another method for manufacturing the concave diffraction grating 2 according to the present embodiment. The concave diffraction grating 2 according to the present embodiment can also be manufactured by performing the steps illustrated in FIGS. 6A to 6D instead of the steps illustrated in FIGS. 5A to 5D.

Figure 6A:
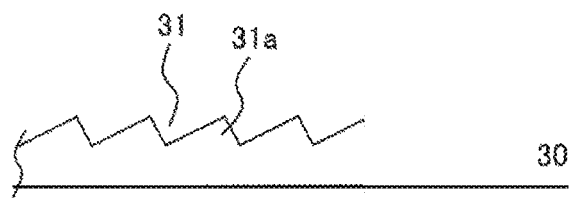
FIG. 6A is a diagram illustrating a first step of another method for manufacturing the concave diffraction grating according to the first embodiment of the present invention.

First, as illustrated in FIG. 6A, the grating grooves 31 are formed in the planar substrate 30 by providing the protrusions 31a on a surface of the planar substrate 30 by machining (for example, imprint using a mechanical device).

Figure 6B:
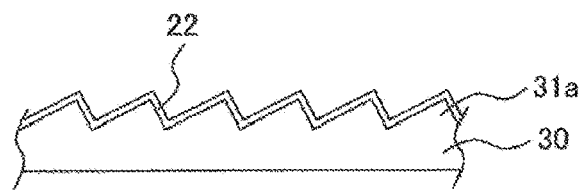
FIG. 6B is a diagram illustrating a second step of the other method for manufacturing the concave diffraction grating according to the first embodiment of the present invention.

Next, as illustrated in FIG. 6B, the reflection film 22 is formed on the grating grooves 31 (protrusions 31a) by vapor deposition or sputtering. The reflection film 22 is formed to have unevenness along the protrusions 31a. The step illustrated in FIG. 6B is the same as the step illustrated in FIG. 5B.

Figure 6C:
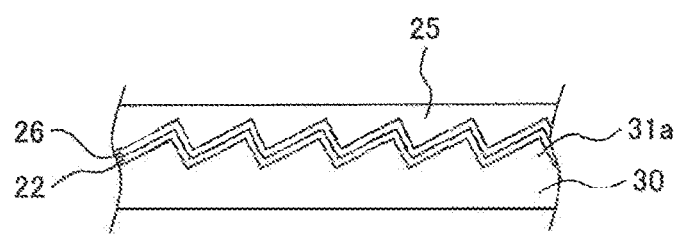
FIG. 6C is a diagram illustrating a third step of the other method for manufacturing the concave diffraction grating according to the first embodiment of the present invention.

Next, as illustrated in FIG. 6C, the seed film 26 is formed on the reflection film 22 by vapor deposition or sputtering, and the holding film 25 is formed on the seed film 26 by plating. The step illustrated in FIG. 6C is the same as the step illustrated in FIG. 5C.

Figure 6D:
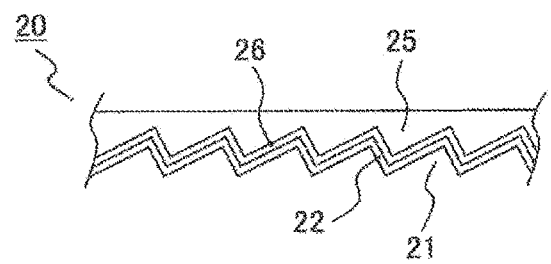
FIG. 6D is a diagram illustrating a fourth step of the other method for manufacturing the concave diffraction grating according to the first embodiment of the present invention.

Next, as illustrated in FIG. 6D, the planar substrate 30 on which the grating grooves 31 (protrusions 31a) are formed is peeled off from a stacked body of the reflection film 22, the seed film 26, and the holding film 25, whereby the planar diffraction grating 20 is produced. The planar diffraction grating 20 is produced by peeling and removing the planar substrate 30 from the stacked body.

Next, the steps illustrated in FIGS. 5E to 5H are performed, whereby the concave diffraction grating 2 according to the present embodiment can be manufactured.

In the concave diffraction grating 2 according to the present embodiment, the shape of the grating grooves 21 of the reflection film 22 reflects the shape of the grating grooves 31 formed in the planar substrate 30, and the shape of the top of each grating groove 21 (top of the protrusion constituting the grating groove 21) reflects the shape of the bottom of each grating groove 31. The concave diffraction grating 2 according to the present embodiment therefore has a small variation in the shape of the grating grooves 21, can reduce noise (stray light), and is excellent in optical characteristics.

Note that the present invention is not limited to the above-described embodiment, and various modifications are possible. For example, the above-described embodiment has been described in detail to make the present invention easily understandable, and the present invention is not necessarily limited to an aspect including all the described configurations. A part of the configuration of an embodiment may be replaced with the configuration of another embodiment. The configuration of an embodiment may be added to the configuration of another embodiment. A part of the configuration of each embodiment may be deleted, or another configuration may be added or replaced.

REFERENCE SIGNS LIST 1 optical device
2 concave diffraction grating
11 white light source
12a, 12b condenser lens
13 sample chamber
14 slit
15 cooling device
16 detector
20 planar diffraction grating
21 grating groove
22 reflection film
23 affixing layer
24 concave substrate
24a concave surface 25 holding film
26 seed film
27 convex substrate
27a convex surface
28 load
30 planar substrate
31 grating groove
31a protrusion
52 conventional concave diffraction grating

The invention claimed is:

1. A method for manufacturing a concave diffraction grating, the concave diffraction grating including:
- a reflection film including a plurality of grating grooves;
- a holding film formed of metal and having one surface provided with the reflection film;
- a concave substrate including a concave surface; and
- an affixing layer that is provided between the concave surface and the other surface of the holding film and affixes the holding film and the reflection film to the concave substrate,
- the holding film having a linear expansion coefficient with which a shape of the holding film changes in the same manner as the reflection film due to a temperature change, the method comprising:
- forming grating grooves on a planar substrate;
- forming the reflection film on the grating grooves of the planar substrate;
- forming the holding film on the reflection film;
- producing a planar diffraction grating in which the grating grooves are formed in the reflection film by peeling the planar substrate from a stacked body of the reflection film and the holding film;
- disposing the affixing layer on an opposite surface of the planar diffraction grating from the surface provided with the grating grooves and disposing the concave substrate to face the surface of the planar diffraction grating on which the affixing layer is disposed; and
- deforming a shape of the planar diffraction grating to follow a shape of the concave surface of the concave substrate to form the concave diffraction grating.

2. The method for manufacturing a concave diffraction grating according to claim 1, wherein the holding film is also present between the grating grooves.

3. The method for manufacturing a concave diffraction grating according to claim 1, wherein the affixing layer is formed of resin or metal.

4. The method for manufacturing a concave diffraction grating according to claim 1, wherein the affixing layer is formed of resin containing metal particles.

5. The method for manufacturing a concave diffraction grating according to claim 1, wherein the grating grooves have a sawtooth shape.

6. The method for manufacturing a concave diffraction grating according to claim 1, wherein the concave substrate is formed of metal, silicon, or glass.

7. An optical device comprising:
- a light source that irradiates a sample with light;
- a concave diffraction grating that disperses the light transmitted through the sample; and
- a plurality of detectors that measure intensity of the light dispersed by the concave diffraction grating,
- wherein the concave diffraction grating is manufactured by the method for manufacturing a concave diffraction grating according to claim 1.

8. The optical device according to claim 7, comprising a cooling device, wherein the cooling device is in contact with the concave diffraction grating.

* * * * *